United States Patent
Tsai et al.

(10) Patent No.: US 9,652,472 B2
(45) Date of Patent: May 16, 2017

(54) SERVICE REQUIREMENT ANALYSIS SYSTEM, METHOD AND NON-TRANSITORY COMPUTER READABLE STORAGE MEDIUM

(71) Applicant: INSTITUTE FOR INFORMATION INDUSTRY, Taipei (TW)

(72) Inventors: Chi-Hung Tsai, Taipei (TW); Ping-I Chen, Taipei (TW); Chun-Yen Chu, Hsinchu County (TW); Shao-Hua Cheng, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 315 days.

(21) Appl. No.: 14/549,697

(22) Filed: Nov. 21, 2014

(65) Prior Publication Data
US 2016/0117345 A1   Apr. 28, 2016

(30) Foreign Application Priority Data
Oct. 22, 2014   (TW) .............................. 103136496 A

(51) Int. Cl.
*G06F 17/30*   (2006.01)
(52) U.S. Cl.
CPC .. *G06F 17/30221* (2013.01); *G06F 17/30589* (2013.01)
(58) Field of Classification Search
None
See application file for complete search history.

(56) References Cited

U.S. PATENT DOCUMENTS 6,519,562 B1 *  2/2003  Phillips ............... G10L 15/1815
                                                        704/240
7,483,871 B2 *  1/2009  Herz ................. G06F 17/30867
(Continued)

FOREIGN PATENT DOCUMENTS

CN   102184224 A   9/2011
CN   103678576 A   3/2014
(Continued)

OTHER PUBLICATIONS

Ajayi, Olusola Olajide et al.,"Data-Driven Appointment and Recruitment System" International Journal of Novel Research in Engineering and Applied Sciences (IJNREAS) 1(2) Apr. 2014.
(Continued)

*Primary Examiner* — Wilson Lee
(74) *Attorney, Agent, or Firm* — McClure, Qualey & Rodack, LLP

(57) ABSTRACT

A service requirement analysis system includes a service provider database and an analysis server. The service provider database stores multiple service provider data entries, and is connected to a client device. The analysis server receives a service requirement string, and performs segmentation and filtering to obtain requirement keywords. The correlation values quantifying semantic relatedness between any two of the requirement keywords are calculated to construct a requirement keyword connected graph for dividing the requirement keywords into one or more requirement keyword groups associated with one or more concepts in the service requirement string. A semantic hierarchical structure of each of the requirement keyword groups is constructed for searching the service provider database to obtain service provider data entries matching the service requirement string. The matched entries are displayed on the client device.

11 Claims, 4 Drawing Sheets

(56) References Cited

U.S. PATENT DOCUMENTS

| | | | |
|---|---|---|---|
| 8,244,566 B1 | 8/2012 | Coley et al. | |
| 8,478,630 B2 | 7/2013 | Reichman | |
| 9,135,344 B2* | 9/2015 | Mason | G06F 17/30864 |
| 9,201,927 B1* | 12/2015 | Zhang | G06F 17/271 |
| 2009/0240586 A1* | 9/2009 | Ramer | G06F 17/30905 |
| | | | 705/14.64 |
| 2010/0094673 A1* | 4/2010 | Lobo | G06Q 30/02 |
| | | | 705/14.69 |
| 2012/0078902 A1* | 3/2012 | Duboue | G06F 17/30675 |
| | | | 707/736 |
| 2012/0278341 A1* | 11/2012 | Ogilvy | G06Q 10/00 |
| | | | 707/749 |
| 2013/0232006 A1* | 9/2013 | Holcomb | G06F 17/30864 |
| | | | 705/14.54 |
| 2013/0268263 A1* | 10/2013 | Park | G06F 17/215 |
| | | | 704/9 |
| 2014/0358890 A1* | 12/2014 | Chen | G06F 17/30654 |
| | | | 707/710 |
| 2015/0032533 A1* | 1/2015 | Raab | G06Q 30/0248 |
| | | | 705/14.47 |

FOREIGN PATENT DOCUMENTS

| | | |
|---|---|---|
| JP | 2001-331515 | 11/2001 |
| JP | 2005-182280 | 7/2005 |
| TW | 574663 | 2/2004 |

OTHER PUBLICATIONS

English translation of abstract of TW 574663 (published Feb. 1, 2004).

Office Action dated Feb. 23, 2016, issued in corresponding Japanese patent application No. 2014-230031.

Office Action dated May 25, 2015 issued in corresponding Taiwan application No. 103136496.

* cited by examiner

SERVICE REQUIREMENT ANALYSIS SYSTEM, METHOD AND NON-TRANSITORY COMPUTER READABLE STORAGE MEDIUM

RELATED APPLICATIONS

This application claims priority to Taiwan Application Serial Number 103136496, filed Oct. 22, 2014, which is herein incorporated by reference.

BACKGROUND

Field of Invention

The present invention relates to requirement analysis system, method and non-transitory computer readable storage medium. More particularly, the present invention relates to service requirement analysis system, method and non-transitory computer readable storage medium with semantic analysis.

Description of Related Art

As the Internet technology advances, more and more service providers list their business information on the online Yellow Pages or similar websites (e.g., Craiglist and Gumtree), users search information on the websites to find service providers matching their requirements to get a wide selection base. Another alternative is online matching platforms specialized in certain industries (e.g., Sweeten for renovation projects) which offer detailed request forms designed for users to fill in, so as to enable the staff of the online matching platforms to fully understand the services requested and provide matching service providers to the users.

In the first scenario described above, the users conduct keyword search for service providers on the online Yellow Pages by entering specific keywords, and search engines often expand the keywords to include synonyms or similar words to make sure that returned search results are comprehensive. In the second scenario, the online matching platforms rely on a carefully designed request form for the users to enter corresponding information, such that the platform staff accurately matches the service requirements and the service providers.

However, both solutions have disadvantages. The users need to be familiar with search strategies to enter effective keywords to obtain relevant search results, for keywords alone do not carry full semantic meaning. For example, when a user inputs "Amazon" to conduct a search, he/she might intend to find the information about the online bookstore or the forest in Latin America. Furthermore, the users often have choose from a huge number of returned search results, and then contact the service providers listed individually to make an appointment. The process is usually frustrating and tedious. As for online matching platforms, the user can only accept a limited number of the service providers the platforms arrange for them.

SUMMARY

The disclosure provides a service requirement analysis system. The service requirement analysis system includes a service provider database and an analysis server. The service provider database stores multiple service provider data entries. The analysis server is connected to the service provider database and a client device. The analysis server includes a processor and a memory, and the memory stores instructions for the processor to execute. The processor executes the instructions to perform the following actions: receiving a service requirement string from the client device, and segmenting and filtering the service requirement string for obtaining multiple requirement keywords; calculating a correlation value between any two of the requirement keywords, and clustering the requirement keywords according to the correlation values for dividing the requirement keywords into one or more requirement keyword groups; constructing semantic hierarchical structures of the requirement keyword groups respectively, and searching the service provider database according to the semantic hierarchical structures to obtain service provider data entries matching the service requirement string; and sending the service provider data entries to the client device for display.

Another aspect of the present disclosure provides a service requirement analysis method including the following operations: receiving a service requirement string from a client device, and segmenting and filtering the service requirement string for obtaining multiple requirement keywords; calculating a correlation value between any two of the requirement keywords, and clustering the requirement keywords according to the correlation values for dividing the requirement keywords into one or more requirement keyword groups; constructing semantic hierarchical structures of the requirement keyword groups respectively, and searching the service provider database according to the semantic hierarchical structures to obtain service provider data entries matching the service requirement string; and sending the service provider data entries to the client device for display.

Yet another aspect of the present disclosure provides a non-transitory computer readable storage medium storing a program causing a computer to execute a service requirement analysis method. The service requirement analysis method includes the following operations: receiving a service requirement string from a client device, and segmenting and filtering the service requirement string for obtaining multiple requirement keywords; calculating a correlation value between any two of the requirement keywords, and clustering the requirement keywords according to the correlation values for dividing the requirement keywords into one or more requirement keyword groups; constructing semantic hierarchical structures of the requirement keyword groups respectively, and searching the service provider database according to the semantic hierarchical structures to obtain service provider data entries matching the service requirement string; and sending the service provider data entries to the client device for display.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
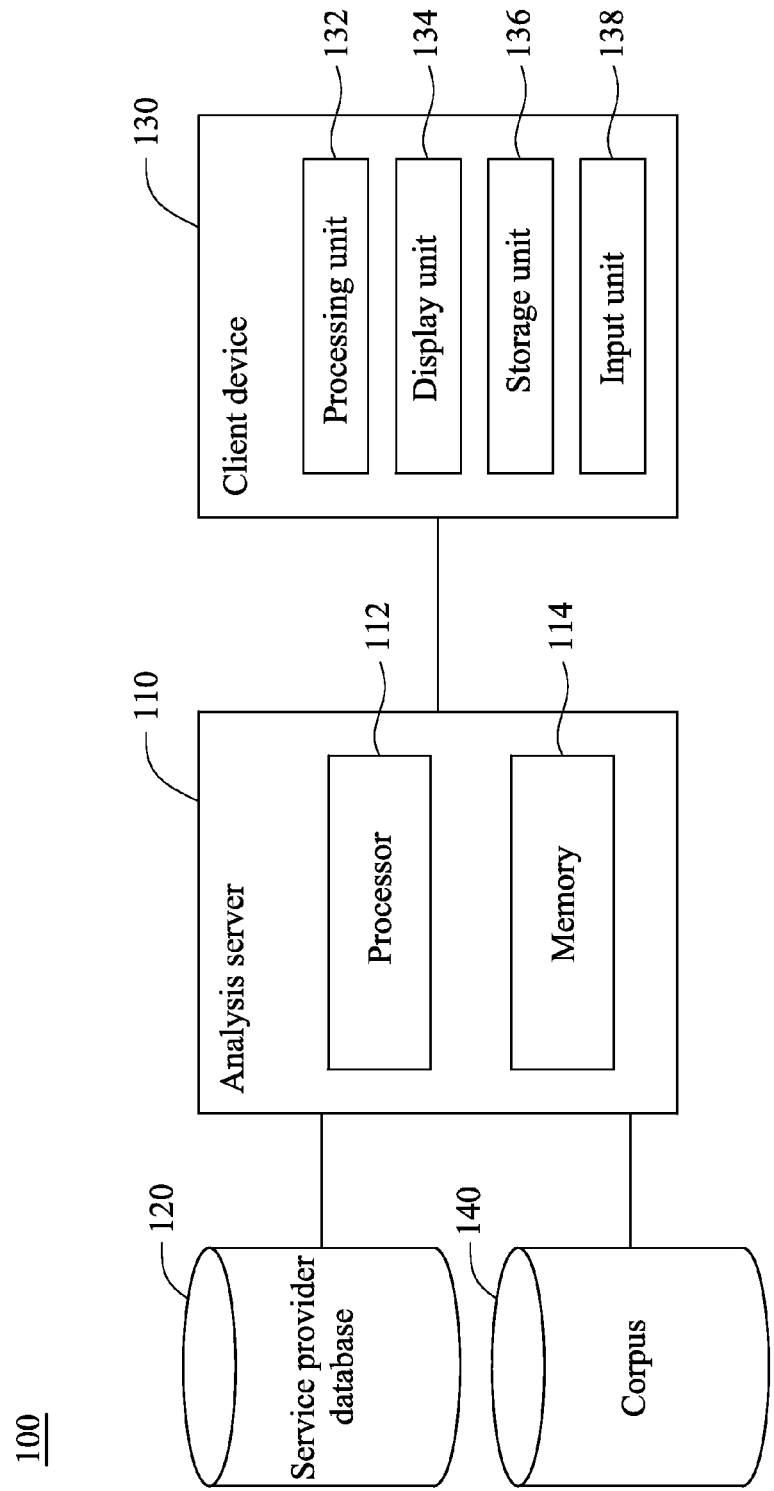
FIG. 1 is a schematic diagram of a service requirement analysis system according to a first embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic diagram of a service requirement analysis system according to a first embodiment of the present disclosure. The service requirement analysis system 100 includes an analysis server 110, a service provider database 120, and a client device 130. The service provider database 120 stores multiple service provider data entries, e.g., renovation service providers, air conditioning system service provider, and building waterproofing service providers. The analysis server 110 is configured for receiving a service requirement string input by a user of the client device 130. The service requirement string is a text segment written in a natural language to describe service requirements, e.g., "my toilet does not stop flushing, and I need to get it fixed." The analysis server 110 is configured for automating the processing and analysis of the service requirement string, so as to save users from the hassle of finding the keywords for accurate search results.

Specifically, the analysis server 110 is configured for extracting service categories and details of the service requirements for the users and then obtaining service provider data entries matching the service requirement string by searching the service provider database 120 according to the analysis result. Moreover, the service provider data entries matching the service requirement string are displayed on the client device 130. Details of the operation and functionality of components of the service requirement analysis system 100 are given below.

The analysis server 110 includes a processor 112 and a memory 114. The client device 130 is connected to the analysis server 110. The service requirement string entered by the user on the client device 130 is transmitted to the analysis server 110. The memory 114 stores at least one instruction, and the processor 112 executes the instructions to process the service requirement string.

The analysis server 110 is a server, a workstation, or a personal computer. The processor 112 is a central processing unit or a microcontroller. The memory 114 is a hard disk, an optical disc, or a flash memory.

The client device 130 includes a processing unit 132, a display unit 134, a storage unit 136, and an input unit 138. In one embodiment, the client device 130 is a smart phone or a tablet; the processing unit 132 is a microprocessor; the display unit 134 is an LCD monitor or an OLED monitor; the storage unit 136 is a SD memory card or a flash memory; the input unit 138 is a keyboard or a touch screen combined with the display unit 134. In another embodiment, the client device 130 is a personal computer; the processing unit 132 is a central processing unit; the display unit 134 is an LCD monitor or an LED monitor; the storage unit 136 is a hard disk, an optical disc, or a solid state drive; the input unit 138 is a mouse and keyboard set.

Figure 2:
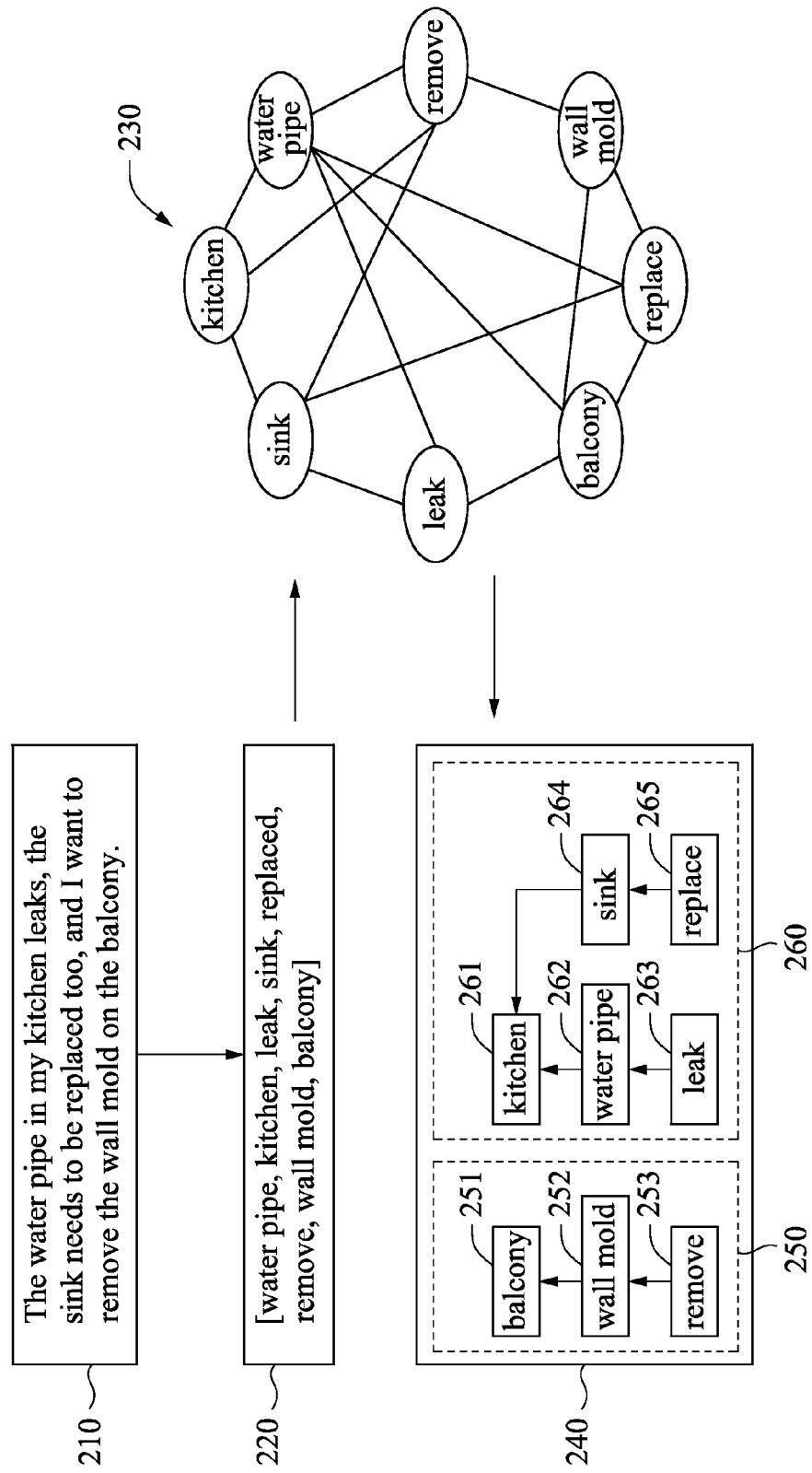
FIG. 2 is a data flow diagram of an analysis process of the service requirement string according to the first embodiment of the present disclosure.

FIG. 2 is a data flow diagram of an analysis process of the service requirement string according to the first embodiment of the present disclosure. The user enters the service requirement string 210 in a natural language, and the analysis server 110 is configured to perform word segmentation for the service requirement string when the natural language is Chinese or languages required to be delimited, e.g., Arabic and Japanese. The analysis server 110 is configured for filtering out words according to lexical categories, e.g., preposition, conjunction, particles, and pronouns, and the words for time and location are filtered. After the aforesaid processing operations, multiple requirement keywords 220 are obtained.

In the present embodiment, the service requirement string 210 is "the water pipe in my kitchen leaks, the sink needs to be replaced too, and I want to remove the wall mold on the balcony," and the requirement keywords extracted are: water pipe, kitchen, leak, sink, replaced, remove, wall mold, balcony.

In one embodiment, the analysis server 110 is configured for utilizing the Chinese Knowledge and Information Processing (CKIP) word segmentation service developed by Academia Sinica and filtering the segmented words according to lexical categories. In one embodiment, the analysis server 110 is configured for segmenting the service requirement string 210 with the Chinese word segmentation package provided in Lucene search engine. Those skilled in the art can choose a suitable word segmentation package according to the application scenario, and the present disclosure is not limited hereto.

The analysis server 110 is configured for calculating a correlation value between any two of the requirement keywords 220, and the correlation value quantifies semantic similarity or semantic relatedness between two requirement keywords 220. In the present embodiment, the analysis server 110 is connected to a corpus 140, and measures co-occurrence of any two requirement keywords with Normalized Google Distance, NGD. The equation of Normalized Google Distance between two requirement keywords t1 and t2 is listed as below:

$$NGD(t1, t2) = \frac{\max\{\log g(t1), \log g(t2)\} - \log g(t1, t2)}{\log N - \min\{\log g(t1), \log g(t2)\}},$$

wherein g(t1) and g(t2) represent numbers of search results when a keyword search in the corpus 140 is conducted with the requirement keyword t1 and the requirement keyword t2 respectively as a search term, while g(t1,t2) represents a number of search results when a keyword search in corpus 140 is conducted with both the requirement keyword t1 and the requirement keyword t2 as the search terms. N represents the number of data entries in the corpus 140.

In one embodiment, the corpus 140 is the database used by the Google search engine, and the numbers of returned search results by the Google search engine are utilized to calculate the correlation values between any two of the requirement keywords. In another embodiment, the corpus 140 includes all entries of Wikipedia, and the numbers of returned search results by the Solr search engine is utilized to calculate the correlation values between any two of the requirement keywords 220. In yet another embodiment, those skilled in the art can choose other open source libraries related to semantic analysis to measure the semantic relatedness, e.g., the semantic measure library.

Conventionally, the requirement keywords 220 in the service requirement string 210 are matched to a manually constructed ontology, so as to understand the semantic meaning of the service requirement string 210. However, matching operation is difficult when the terms used in the service requirement string 210 are different from those in the ontology. Moreover, a huge amount of labor is required in establishing a cross-domain ontology, and therefore rendering ontology matching uneconomical. Therefore, the present disclosure provides an automatic solution to cluster the requirement keywords 220 and extract the core concepts in the service requirement string 210.

The analysis server 110 is configured for performing clustering analysis to divide the requirement keywords 220 into one or more groups according to the requirement keywords 220 and the correlation values. Those skilled in the art can choose a suitable clustering algorithm from the hierarchical clustering algorithms, the K-means clustering algorithm and its variant, and the Graph clustering algorithm.

In one embodiment, the analysis server 110 is configured for clustering the requirement keywords 220 with the K-means algorithm. The initial operation of the clustering is selecting an integer K of centroids out of all requirement keywords 220 randomly. The assignment step is assigning each of the requirement keywords 220 to the centroid with which the correlation value is highest, and hence there are K groups. The update step is calculating a new mean of each group to be the new centroid according to the results of the assignment step. The assignment step and the update step are repeated until the means for each group does not change, and the final groups are the requirement keyword groups. In practice, the correlation values between any two requirement keywords in the same requirement keyword group are smaller than a threshold value, and the correlation values between the means for each requirement keyword group are larger than another threshold value. In other words, the clustering generates the requirement keyword groups with large inter-group variance and small intra-group variance.

In another embodiment, each of the requirement keywords is regarded as a node, and two nodes are connected with an edge to form a requirement keyword connected graph 230. The requirement keyword connected graph 230 is an undirected graph. The analysis server 110 is configured for removing the edges connecting two nodes when the correlation value between the two requirement keywords associated with the edge is smaller than a correlation threshold value, so as to perform clustering afterwards. In the requirement keyword connected graph 230 illustrated in FIG. 2, no edge connects "sink" and "wall mold" because the edge is filtered with the correlation threshold value. In one embodiment, the correlation threshold value is 0.1, so as to filter the edges associated with the pairs of nodes with smaller degree of semantic relatedness. In another embodiment, the correlation threshold value is 0.5. The numbers listed are only by example, and the disclosure is not limited hereto. Those skilled in the art can adjust the correlation threshold value according to application scenarios.

The analysis server 110 is configured for performing clustering on the requirement keyword connected graph 230 with the K-core clustering algorithm. It is worth noting that the K-core clustering algorithm removes the unnecessary edges and nodes in the requirement keyword connected graph 230, so as to generate subgraphs in which each node in the subgraphs is connected to at least K nodes in the subgraphs. Each subgraph represents one requirement keywords group.

In yet another embodiment, the clustering result generated from the K-core algorithm depends on the correlation threshold value for filtering the requirement keyword connected graph 230. When the correlation threshold value is too low, requirement keywords belonging to different concepts are unable to be divided with the K-core algorithm. Dynamic clustering verification is performed to adjust the correlation threshold value utilized for filtering the requirement keyword connected graph 230. Dynamic clustering verification begins with organizing the correlation values between any two of the requirement keywords 220 into a correlation value sequence in an ascending order, and the concept of binary search is utilized in the following operations. The median value of the correlation value sequence is set as the correlation value threshold to filter the requirement keyword connected graph 230. The K-core algorithm with the integer K equal 2 is performed on the requirement keyword connected graph 230. When the requirement keyword connected graph 230 is divided into at least two concepts (requirement keyword groups), the third quartile value of the correlation value sequence is set as the correlation threshold value to filter the requirement keyword connected graph 230. When the requirement keyword connected graph 230 is still divided into at least two concepts (requirement keyword groups), the third quartile value is set as the correlation threshold value. On the other hand, when the requirement keyword connected graph 230 is not divided into at least two concepts (requirement keyword groups) with the median value as the correlation threshold value, the first quartile value is set as the correlation threshold value to filter the requirement keyword connected graph 230. When the requirement keyword connected graph 230 is not divided into at least two concepts (requirement keyword groups) with the first quartile value as the correlation threshold value, it is determined that the service requirement string 210 contains one single core concept.

In the present embodiment, the requirement keywords 220 are divided into two requirement keyword groups 250/260. The analysis server 110 is further configured for constructing semantic hierarchical structures 240 of the requirement keyword groups 250/260, respectively. Illustratively, the requirement keyword groups 250/260 are collections of requirement keywords 220, but connections between any two requirement keywords in the semantic hierarchical structures 240 are directional. Connection directions in the semantic hierarchical structures 240 are utilized to find a root requirement keyword for each of the requirement keyword groups.

In one embodiment, the connection direction between a requirement keyword t1 and a requirement keyword t2 in one requirement keyword group is established with the concept of Normalized Google Distance and conditional probability, and the equations are listed as below:

$$CP(t1 \rightarrow t2) = \frac{\log g(t1, t2)}{\log g(t2)},$$

$$CP(t2 \rightarrow t1) = \frac{\log g(t1, t2)}{\log g(t1)},$$

wherein g(t1, t2), g(t1), and g(t2) are defined as in the equation for Normalized Google Distance, and CP(t1→t2) represents the probability that the requirement keyword t1 is present in one data entry stored in the corpus 140 under the condition that the requirement keyword t2 is present in the same data entry. Therefore, the requirement keyword t2 is a subordinate word for the requirement keyword t1 when CP(t1→t2) is larger than CP(t2→t1), and hence the connection direction between the requirement keyword t2 and the requirement keyword t1 is from the requirement keyword t2 to the requirement keyword t1.

In another embodiment, the PageRank algorithm is utilized to establish the connection directions in the requirement keyword groups 250/260 and determine the root requirement keywords for the requirement keyword groups 250/260. The PageRank algorithm analyzes how webpages link with each other, and a webpage linked by more webpages is of higher importance. The PageRank increases as the importance and the number of links that one webpage has increases, and thus useful for determining the root requirement keywords in the requirement keyword groups 250/260. The equation for calculating PageRank of the requirement keyword t1 in the requirement keyword group is given below:

$$PageRank(t1) = \frac{(1-d)}{N} + d \sum_{t2 \in B(t1)} \frac{PageRank(t2)}{O(t2)},$$

wherein PageRank(t1) represents the PageRank of the requirement keyword t1, d represents a damping factor (set as 0.85 by default), N represents the number of the requirement keywords in the requirement keyword group, B(t1) represents the set of requirement keywords connected to the requirement keyword t1 in the requirement keyword group, and O(t2) represents the number of requirement keywords connected to the requirement keyword t2 in the requirement keyword group.

In yet another embodiment, the service requirement string 210 includes a title field. The concept of Term Frequency is incorporated with the K Nearest Neighbor (KNN) algorithm to configure the analysis server 110 for establishing the connection directions and determining the root requirement keywords. Term Frequency is utilized to measure the co-occurrence of two requirement keywords occurring in the same sentence of the documents stored in the corpus 140. When two requirement keywords occur in the same sentence frequently, the semantic relatedness between the two requirement keywords is high. Specifically, the present embodiment highlights the importance of the title field of the service requirement string 210 by setting a second correlation value $r_{ij}$ between a requirement keyword $t_i$ and a requirement keyword $t_j$ as 1 when the requirement keyword $t_i$ and the requirement keyword $t_j$ both occur in the title field. When the requirement keyword $t_i$ and the requirement keyword $t_j$ do not occur in the title field of the service requirement string 210, the second correlation value $r_{ij}$ is calculated with the following equation according to the corpus 140:

$$r_{ij} = \frac{g(t_i, t_j)}{\max\{g(t_i, g(t_j))\}},$$

wherein $g(t_i)$ and $g(t_j)$ represent the tem frequency-inverse document frequency (tf-idf) of the requirement keyword $t_i$ and the requirement keyword $t_j$, respectively, and $g(t_i,t_j)$ represents the tem frequency-inverse document frequency (tf-idf) with both the requirement keyword $t_i$ and the requirement keyword $t_j$. In other words, $g(t_i,t_j)$ is related to the number of documents with both the requirement keyword $t_i$ and the requirement keyword $t_j$ in the corpus 140 when the requirement keyword $t_i$ and the requirement keyword both occur in the service requirement string 210.

The analysis server 110 is configured for constructing a weighted connected graph for the requirement keyword groups 250/260, respectively. A requirement keyword in a requirement keyword group represents a node, and an edge weight associated with an edge connecting the node $t_i$ and the node $t_j$ is the second correlation value $r_{ij}$. A node weight associated with a node is the sum of the tf-idf plus the average of the edge weights associated with the connected edges to the node (i.e., the second correlation value). The analysis server 110 selects an integer K of connected requirement keywords with the highest second correlation values for each requirement keyword in the requirement keyword group 250 to form a candidate keyword group. In one embodiment, TF-IDF is utilized to replace NGD in the conditional probability equations to establish the connection directions in a subgraph associated with the candidate keyword group, and the subgraph is a part of the weighted connected graph. In another embodiment, PageRank is utilized to establish the connection directions in the subgraph associated with the candidate keyword group, and the root requirement keyword is determined with the connection directions. The analysis server 110 is configured for performing similar operations on the requirement keywords in the requirement keyword group 260 to construct the semantic hierarchical structure.

The semantic hierarchical structures 240 for the requirement keyword groups 250/260 are shown in FIG. 2. The analysis server 110 is configured for searching the service provider database 120 according to the semantic hierarchical structures 240 to obtain service provider data entries matching the service requirement keyword 210 and send and display them on the client device 130. In the present embodiment, the root requirement keyword for the requirement keyword group is "balcony" 251, and both "wall mold" 252 and "fix" 253 are directed to "balcony" 25. The requirement keyword group 260 includes the requirement keywords "kitchen" 261, and the requirement keywords "water pipe" 262 and "sink" 264 are subordinate to "kitchen" 261 with "leak" 263 and "replace" 265 pointing to "water pipe" 262 and "sink" 264 respectively.

In one embodiment, the service provider data entries stored in the service provider database 120 include information of available time, service area, and other details. The analysis server 110 is configured for retrieving calendar information and location information from the client device 130, and filtering the service provider data entries displayed on the client device 130 according to the calendar information and the location information. The calendar information is the schedule and plan of the user, and is entered and stored in the calendar application installed on the client device 130. The calendar information can also be from Google calendar or other cloud calendar applications. The location information includes the residential address and work address of the user.

In another embodiment, the service provider data entries stored in the service provider database 120 include information of available time, service area, and other details. The analysis server 110 is configured for retrieving time information and location information from the service requirement string 210 and filtering the service provider data entries sent to and displayed on the client device 130 according to the time information and the location information in the service requirement string 210. For example, the service requirement string 210 entered by the user is "the water pipe in my kitchen leaks, the sink needs to be replaced too, and I want to remove the wall mold on the balcony. Tuesday and Wednesday afternoons work for me, and my address is xxxxx." The analysis server 110 is configured for performing service requirement analysis to obtain the service provider data entries matched with the requirement keywords 220 in the service requirement string 210, sending the matched service provider data entry to the client device 130 for display on the client device 130, and filtering the service provider data entries displayed on the client device 130 with "Tuesday and Wednesday afternoons" in the service requirement string 210 as the time information and the address in the service requirement string 210 as the location information.

In practice, the service provider database 120 and the corpus 140 are stored in the same storage device, e.g., hard disk, flash memory, or other non-transitory computer readable storage medium that one of ordinary skill in the art can think of. The service provider database 120 and the corpus 140 can be stored in separate storage devices or in a cloud database accessible from the Internet. One of ordinary skill in the art can design the implementation of the service provider database 120 and the corpus 140 according to the application scenario without departing from the scope and spirit of the present disclosure.

Figure 3:
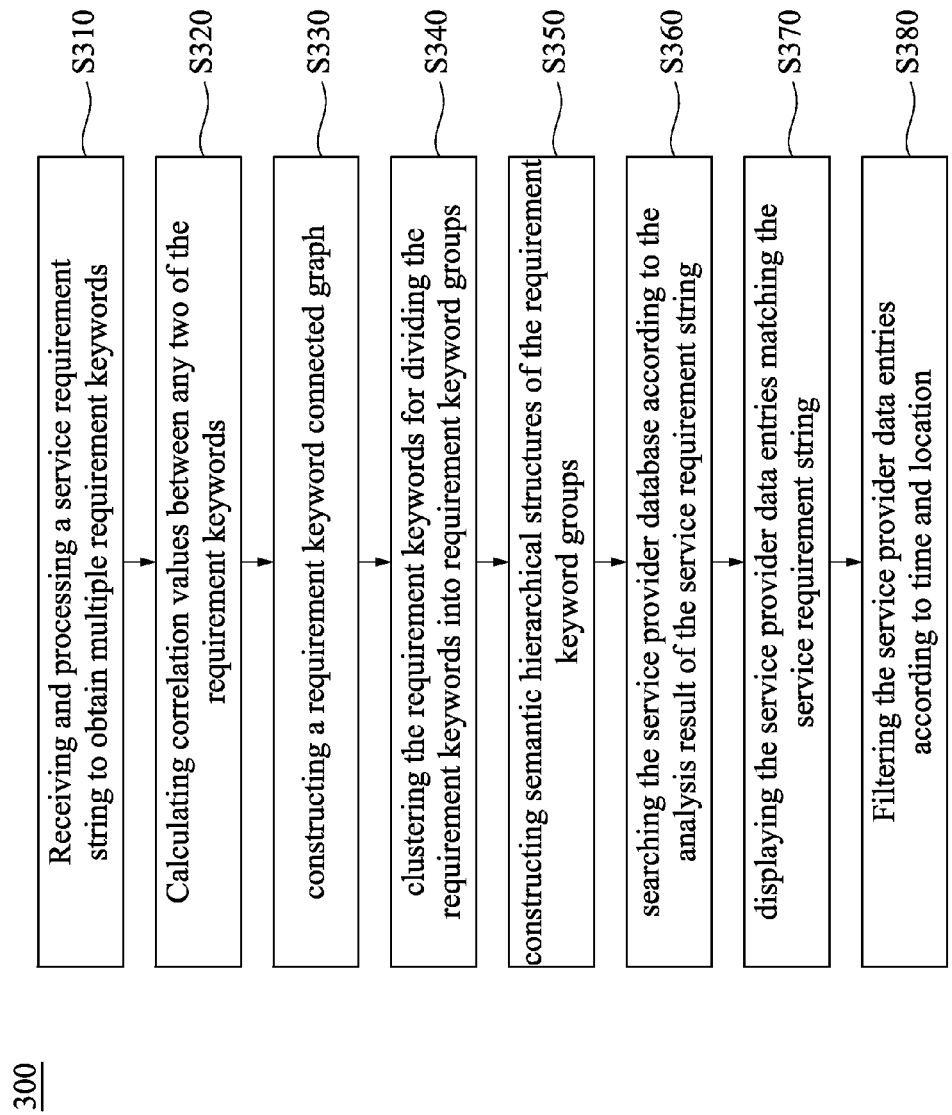
FIG. 3 is a flow chart of a service requirement analysis method according to a second embodiment of the present disclosure.

FIG. 3 is a flow chart of a service requirement analysis method according to a second embodiment of the present disclosure. The service requirement analysis method 300 includes multiple operations for analyzing a service requirement string that a user enters in a natural language and providing service provider data entries matching the service requirement string to the user. For ease of understanding and clarity, the service requirement analysis system 100 shown in FIG. 1 is taken as an example in the following detailed descriptions for the service analysis method 300, but the present disclosure is not limited hereto. While the process flow described below includes a number of operations that appear to be in a specific order, it should be apparent that these operations may include more or fewer operations, which may be executed serially or in parallel (e.g., using parallel processors or in a multi-threading environment).

In operation S310, the analysis server 110 is configured for receiving a service requirement string from the client device 130, and segmenting and filtering the service requirement string for obtaining multiple requirement keywords. The details of performing word segmentation on the service requirement string is given in the accompanying text of FIG. 1, and not repeated herein.

In operation S320, the analysis server 110 is configured for calculating a correlation value between any two of the requirement keywords, and the correlation values serve as a quantitative measure of the semantic relatedness between two requirement keywords. In one embodiment, the correlation values are calculated with Normalized Google Distance. In another embodiment, the correlation values are calculated with other distance measures for quantifying the semantic relatedness.

In operation S330, the analysis server 110 is configured for constructing a requirement keyword connected graph according to the requirement keywords and the correlation values. The nodes in the requirement keyword connected graph represent the requirement keywords extracted from the service requirement string. When the correlation value between two requirement keywords is greater than a correlation value threshold, an edge connects the two requirement keywords. In other words, connection of the requirement keyword connected graph is adjusted by filtering the correlation values with the correlation value threshold.

In one embodiment, the correlation value threshold for filtering the edges in the requirement keyword connected graph is set as a fixed predetermined value, ranging from 0.1-0.2. In another embodiment, the correlation value threshold for filtering the edges in the requirement keyword connected graph is set according to the distribution of a correlation value sequence of all the correlation values of all pairs of the requirement keywords, e.g., a first quartile or a third quartile of the correlation value sequence.

In operation S340, the analysis server 110 is configured for clustering the requirement keywords according to the correlation values for dividing the requirement keywords into one or more requirement keyword groups. In one embodiment, the analysis server 110 is configured for performing the K-means algorithm based on Normalized Google Distance as the correlation value for clustering the requirement keywords into one or more requirement keyword groups. In another embodiment, the analysis server 110 is configured for performing K-core algorithm based on the requirement keyword connected graph with the connection adjusted with a core correlation value threshold for clustering the requirement keywords into one or more requirement keyword groups and determining whether all the requirement keywords belong to a single core concept or multiple core concepts. The details are given in the accompanying text of FIG. 2, and not repeated herein.

In operation S350, the analysis server 110 is configured for constructing semantic hierarchical structures of the requirement keyword groups respectively. Connection directions are established for any two of the requirement keywords in a requirement keyword group. In other words, a subordinate requirement keyword points to a superordinate requirement keyword. For example, "kitchen" 261 is highly related to "sink" 264 with the latter positioned in the former, thus the connection direction between these two requirement keywords pointing from the "sink" 264 to the "kitchen" 261. After the connection direction is established, the most superordinate requirement keyword in a requirement keyword group is the root requirement keyword to which all the requirement keywords in the requirement keyword group point. The details of establishing the connection directions are given in the previous paragraphs, and not repeated herein.

In operation S360, the analysis server 110 is configured for searching a service provider database 120 storing multiple service provider data entries according to the semantic hierarchical structures to obtain service provider data entries matching the service requirement string. In one embodiment, the analysis server 110 is configured for conducting a hierarchical search in the service provider database 120 according to the semantic hierarchical structures of the requirement keyword groups. Specifically, the root requirement keyword of each of the requirement keyword groups is utilized to search the categories of the service provider data entries, and the rest of the requirement keywords in the requirement keyword groups are utilized as conditions to filter the service provider data entries in the category associated with the root requirement keyword. The service provider data entries are stored in the service provider database 120 in a hierarchical structure. For example, the service provider data entries are divided into a kitchen category and a balcony category. The kitchen category is further divided into a water pipe subcategory, a sink subcategory, a water filter subcategory, and a gas pipeline subcategory.

In operation S370, the analysis server 110 is configured for sending the service provider data entries matching each of the requirement keyword groups of the service requirement string to the client device 130 for displaying the service provider data entry on the client device 130 respectively. When one of the service provider data entries is associated with different requirement keyword groups, the service provider data entry is displayed for once instead of being displayed multiple times. In one embodiment, the service provider data entries include the information of title, available time, service area, price, reviews, and other details.

In operation S380, the analysis server 110 is configured for filtering the service provider data entries obtained in the operation S370 according to temporal and spatial information. In one embodiment, the analysis server 110 is configured for retrieving calendar information and location information (e.g., the residential address and work address of the user) from the client device 130 and filtering the service provider data entries displayed on the client device 130 according to the calendar information and the location information, so as to filter out the service providers unable to provide service during the free time in the calendar information. In another embodiment, the analysis server 110 is configured for retrieving time information and the location information from the service requirement string and filtering the service provider data entries obtained in the operation S370 displayed on the client device 130 according to the time information and the location information.

Figure 4:
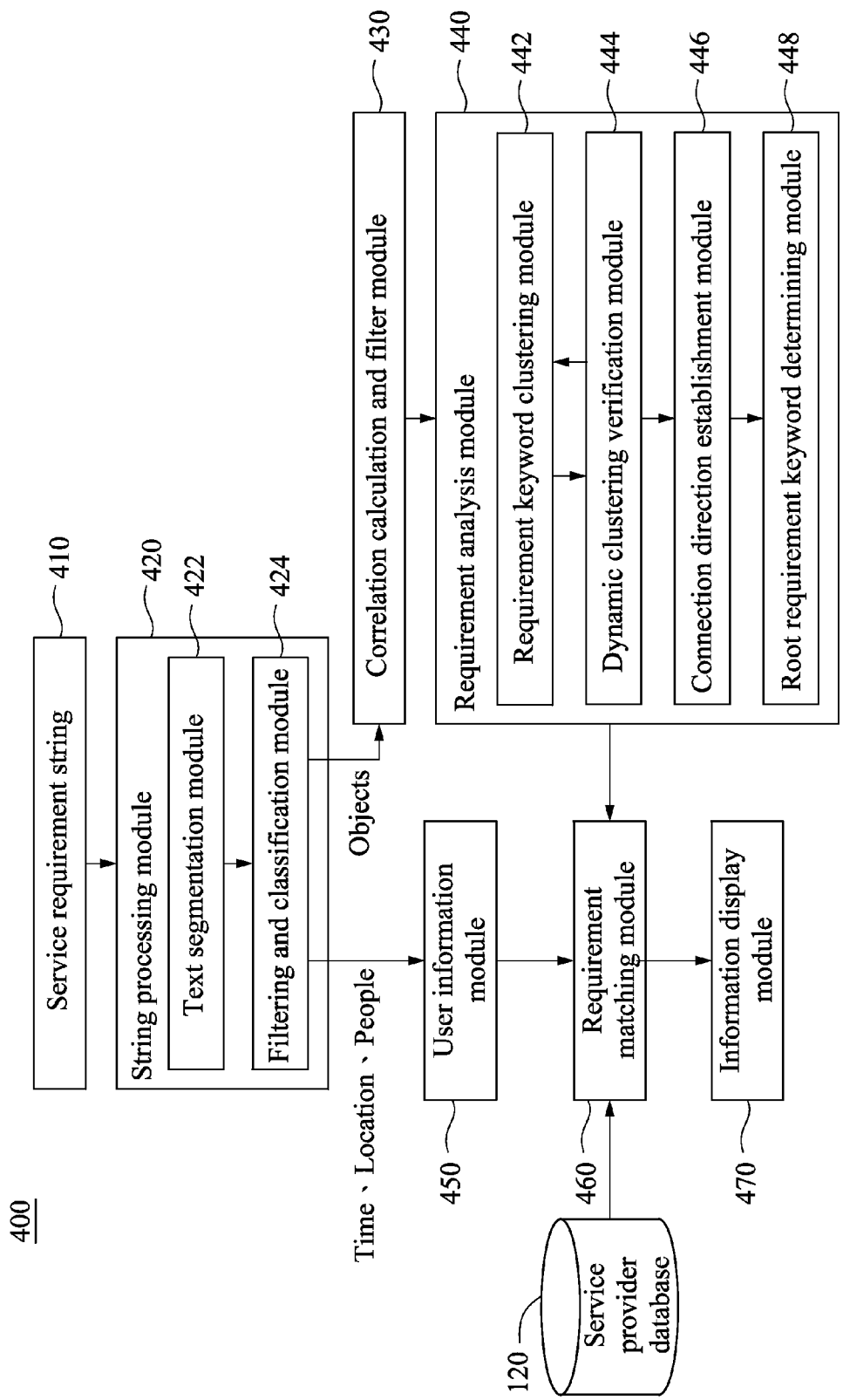
FIG. 4 is an architecture schematic diagram of program implementation of a service requirement analysis method according to a third embodiment of the present disclosure.

FIG. 4 is an architecture schematic diagram of program implementation of a service requirement analysis method according to a third embodiment of the present disclosure. A program is the implementation of a service requirement analysis method, and the program is stored in a non-transitory computer readable storage medium, such as a hard disk, an optical disc, flash memory, or any other form that one of ordinary skill in the art can think of. A computer reads the non-transitory computer readable storage medium storing a program to execute the service requirement analysis method. The program includes a string processing module 420, a correlation calculation module and filter module 430, a service requirement analysis module 440, a user information module 450, a requirement matching module 460, and an information display module 470. The string processing module 420 is configured for performing word segmentation and filtering on a service requirement string 410 for obtaining requirement keywords. The correlation calculation module and filter module 430 is configured for calculating the semantic relatedness between any two of the requirement keywords. The requirement matching module 460 is configured for obtaining service provider data entries matching the description of the service requirement string 410. The user information module 450 is configured for adjusting and filtering the service provider data entries from the requirement matching module 360. The information display module 470 is configured for displaying the service provider data entries to the user. The functionality of each module is described in detail as follows.

The string processing module 420 includes a text segmentation module 422 and a filtering and classification module 424. When the service requirement string 410 is in a language without delimiter between words, e.g., Chinese, text segmentation module 422 is configured for segmenting the service requirement string 410 into words, the smallest element that may be uttered in isolation with semantic or pragmatic content. The text segmentation module 422 is implemented with importing the open source text segmentation engines or compiling computer instructions executing the Genetic Algorithm customized for text segmentation. The filtering and classification module 424 is configured for filtering the words from the text segmentation module 422 according to the lexical categories. In one embodiment, the filtering and classification module 424 is configured for retaining the words related to time, location, and people, and sending the words related to objects to the correlation calculation and filter module 430 for further processing. The words not belonging to the above categories are discarded.

The string processing module 420 is configured for preliminarily processing the service requirement string 410 and sending requirement keywords related to objects to the correlation calculation and filter module 430. The requirement keywords represent requirements of the service described in the service requirement string 410. The correlation calculation module and filter module 430 is configured for calculating correlation values between any two of the requirement keywords to quantify the semantic relatedness. In the present embodiment, the correlation calculation and filter module 430 is configured for constructing a requirement keyword connected graph according to the correlation values. The correlation values are calculated with Normalized Google Distance, and the connection between any two requirement keywords in the requirement keyword connected graph is filtered with a correlation value threshold. If the correlation value between two requirement keywords is greater than the correlation value threshold, the requirement keywords are closely related and therefore connected with an edge. The correlation value can be calculated with other algorithms. The details are given in the accompanying text of FIG. 2, thus not repeated herein.

The requirement analysis module 440 is configured for automatically analyze the requirement keywords without an ontology. The analysis results include the service categories and conditions, and are utilized for searching the service provider database 120 for obtaining the service provider data entries matching the service requirement string 410. The user enters his/her request in a natural language instead of determining multiple accurate keywords by themselves so as to improve the search for users unfamiliar with search strategies.

The requirement analysis module 440 includes a requirement keyword clustering module 442, a dynamic clustering verification module 444, a connection direction establishment module 446, and a root requirement keyword determining module 448. The requirement keyword clustering module 442 is configured for performing clustering analysis with one of the aforementioned algorithms for clustering the requirement keywords into one or more requirement keyword group. In the present embodiment, the requirement keyword clustering module 442 is configured for clustering the requirement keywords with the requirement keyword connected graph and the K-core algorithm. It is worth noting that the service requirement string 410 sometimes includes single concept, and thus clustering the requirement keywords into multiple requirement keyword groups leads to unsatisfactory search results. The dynamic clustering verification module 444 is configured for dynamically adjusting a correlation value threshold according to the distribution of all the correlation values between any two of the requirement keywords and filtering the connections of the requirement keyword connected graph with the correlation value threshold. The clustering analysis is performed on the requirement keyword connected graph filtered with different correlation value thresholds to verify whether the requirement keywords are of more than one concept (requirement keyword group). The details of the operation is described in the accompanying text of FIG. 2, and not repeated herein.

The connection direction establishment module 446 and the root requirement keyword determining module 448 are configured for constructing semantic hierarchical structures of the requirement keyword groups respectively. The connection direction establishment module 446 is configured for establishing a connection direction between any two of the requirement keywords in each of the requirement keyword groups. The connection direction is from a subordinate requirement keyword to a superordinate requirement keyword. The connection direction establishment module 446 is configured for establishing the connection directions with the PageRank algorithm, the TF-IDF algorithm, or the KNN algorithm. The details of the operation is described in the accompanying text of FIG. 2, and not repeated herein. In another embodiment, the connection direction establishment module 446 is configured for establishing the connection direction between any two of the requirement keywords by searching a corpus (e.g., WordNet) storing terms in a semantic hierarchical structure to determine the connection direction. The root requirement keyword determining module 448 is configured for determining a root requirement keyword for each of the requirement keyword groups according to the connection directions established by the connection direction establishment module 446. The root requirement keyword is the most superordinate requirement keyword to which all the other requirement keywords point.

The requirement matching module 460 is configured for receiving the requirement keyword groups and the semantic hierarchical structures associated with the requirement keyword groups from the requirement analysis module 440 and conducting a hierarchical search in the service provider database 120. The root requirement keywords for the requirement keyword groups are utilized for searching the service categories of the service provider data entries, and the rest of the requirement keywords are utilized as conditions to filter the service provider data entries to find the service provider data entries matching the service requirement string 410.

In another embodiment, the user information module 450 is configured for retrieving calendar information and location information (e.g., residential or work address) from the user. When the words from the string processing module 420 do not include words related to the time and location, the calendar information and the location information are taken as temporal and spatial limitations. When the words from the string processing module 420 include words related to time and location, those words are taken as the temporal and spatial limitations. The requirement matching module 460 is configured for filtering the service provider data entries matching the service requirement string 410 according to the temporal and spatial limitations from the user information module 450.

The information display module 470 is configured for sending and displaying the service provider data entries on the client device 130, and the service provider data entries displayed are matched with the temporal and spatial restrictions from the user information module 450. As a result, the service provider data entries displayed for the user are associated with the service providers who can provide the service at the time and place specified by the user, so as to save the trouble of negotiating an appointment.

The modules 420-470 for executing the service analysis method are implemented in software, hardware or firmware. If an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. For example, the modules can be combined with the central processing unit to be executed.

The present disclosure describes a service requirement analysis system, method and non-transitory computer readable storage medium for improving the efficiency of finding service providers on the conventional electronic yellow pages and similar websites. Users can enter the service requirement in a natural language without determining accurate keywords for satisfactory search results. Semantic contextual information is provided when entering the service requirement in the natural language. The service requirement string is automatically processed with semantic analysis to extract the categories and conditions of the service requirements for conducting an accurate search, so as to save the labor of matching the service providers and the service requirements manually. Furthermore, temporal and spatial information is utilized to filter the service provider data entries matching the service requirement string to reduce the effort of contacting the service providers for negotiating a time and place for an appointment. The present disclosure is not limited to searching for renovation service providers but also applicable for searching for cultural and entertainment activities. For example, the user enters a service requirement string as "I am free every Tuesday night, and I want to learn something about psychology," and the service requirement analysis system is configured for conducting a search in a database to find the course information matching the service requirement string. The solutions described in the present disclosure have the above-mentioned advantages under all application scenarios.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the disclosure. In view of the foregoing, it is intended that the present invention cover modifications and variations of this invention provided they fall within the scope of the following claims.

What is claimed is:

1. A service requirement analysis system, comprising:
a service provider database configured for storing a plurality of service provider data entries; and
an analysis server connected to a client device, and the analysis server comprising a processor and a memory storing one or more instructions to be executed by the processor for:
receiving a service requirement string from the client device, segmenting and filtering the service requirement string for obtaining a plurality of requirement keywords;
calculating a correlation value between any two of the requirement keywords, and clustering according to the correlation values for dividing the requirement keywords into one or more requirement keyword groups;
constructing semantic hierarchical structures of the requirement keyword groups respectively, and searching the service provider database according to the semantic hierarchical structures to obtain at least one service provider data entry matching the service requirement string; and
sending the at least one service provider data entry to the client device for displaying the at least one service provider data entry on the client device;
wherein the instructions executed by the processor of the analysis server for constructing the semantic hierarchical structures of the requirement keyword groups comprise:

establishing a connection direction between any two of the requirement keywords in each of the requirement keyword groups; and determining a root requirement keyword for each of the requirement keyword groups according to the connection directions.

2. The service requirement analysis system as claimed in claim 1, wherein the instructions executed by the processor of the analysis server for clustering the requirement keywords comprise:

constructing a requirement keyword connected graph according to the correlation values, and filtering the correlation values with a correlation threshold value to adjust connection of the requirement keyword connected graph for clustering the requirement keywords into the requirement keyword groups.

3. The service requirement analysis system as claimed in claim 1, wherein the instructions executed by the processor of the analysis server comprise:

retrieving calendar information and location information from the client device, and filtering the at least one service provider data entry displayed on the client device according to the calendar information and the location information.

4. The service requirement analysis system as claimed in claim 1, wherein the instructions executed by the processor of the analysis server comprise:

retrieving time information and location information from the service requirement string, and filtering the at least one service provider data entry displayed on the client device according to the time information and the location information.

5. The service requirement analysis system as claimed in claim 1, wherein the service provider data entries are stored in the service provider database in a hierarchical structure, and the analysis server is configured for searching the service provider database according to the semantic hierarchical structures.

6. A service requirement analysis method, comprising:

receiving a service requirement string from a client device, and segmenting and filtering the service requirement string for obtaining a plurality of requirement keywords;

calculating a correlation value between any two of the requirement keywords, and clustering the requirement keywords according to the correlation values for dividing the requirement keywords into one or more requirement keyword groups;

constructing semantic hierarchical structures of the requirement keyword groups respectively, and searching a service provider database according to the semantic hierarchical structures to obtain at least one service provider data entry matching the service requirement string, wherein the service provider database is configured for storing a plurality of service provider data entries; and sending the at least one service provider data entry to the client device for displaying the at least one service provider data entry on the client device;

wherein the operations of constructing semantic hierarchical structures of the requirement keyword groups comprise:

establishing a connection direction between any two of the requirement keywords in each of the requirement keyword groups; and determining a root requirement keyword for each of the requirement keyword groups according to the connection directions.

7. The service requirement analysis method as claimed in claim 6, wherein the operations of clustering the requirement keywords comprise:

constructing a requirement keyword connected graph according to the correlation values, and filtering the correlation values with a correlation threshold value to adjust connection of the requirement keyword connected graph for clustering the requirement keywords into the requirement keyword groups.

8. The service requirement analysis method as claimed in claim 6, further comprising:

retrieving calendar information and location information from the client device, and filtering the at least one service provider data entry displayed on the client device according to the calendar information and the location information.

9. The service requirement analysis method as claimed in claim 6, further comprising:

retrieving time information and location information from the service requirement string, and filtering the at least one service provider data entry displayed on the client device according to the time information and the location information.

10. The service requirement analysis method as claimed in claim 6, wherein the operations of searching the service provider database comprise:

searching the service provider database according to the semantic hierarchical structures, wherein the service provider data entries are stored in the service provider database in a hierarchical structure.

11. A non-transitory computer readable storage medium storing a program causing a computer to execute a service requirement analysis method, the service requirement analysis method comprising:

receiving a service requirement string from a client device, and segmenting and filtering the service requirement string for obtaining a plurality of requirement keywords;

calculating a correlation value between any two of the requirement keywords, and clustering the requirement keywords according to the correlation values for dividing the requirement keywords into one or more requirement keyword groups;

constructing semantic hierarchical structures of the requirement keyword groups respectively, and searching a service provider database according to the semantic hierarchical structures to obtain at least one service provider data entry matching the service requirement string, wherein the service provider database is configured for storing a plurality of service provider data entries; and sending the at least one service provider data entry to the client device for displaying the at least one service provider data entry on the client device;

wherein the operations of constructing semantic hierarchical structures of the requirement keyword groups comprise:

establishing a connection direction between any two of the requirement keywords in each of the requirement keyword groups; and determining a root requirement keyword for each of the requirement keyword groups according to the connection directions.

* * * * *